L. A. PETERSON.
STEERING DEVICE FOR AUTOMOBILES AND THE LIKE.
APPLICATION FILED MAR. 22, 1916.
1,180,940.
Patented Apr. 25, 1916.
2 SHEETS—SHEET 1.
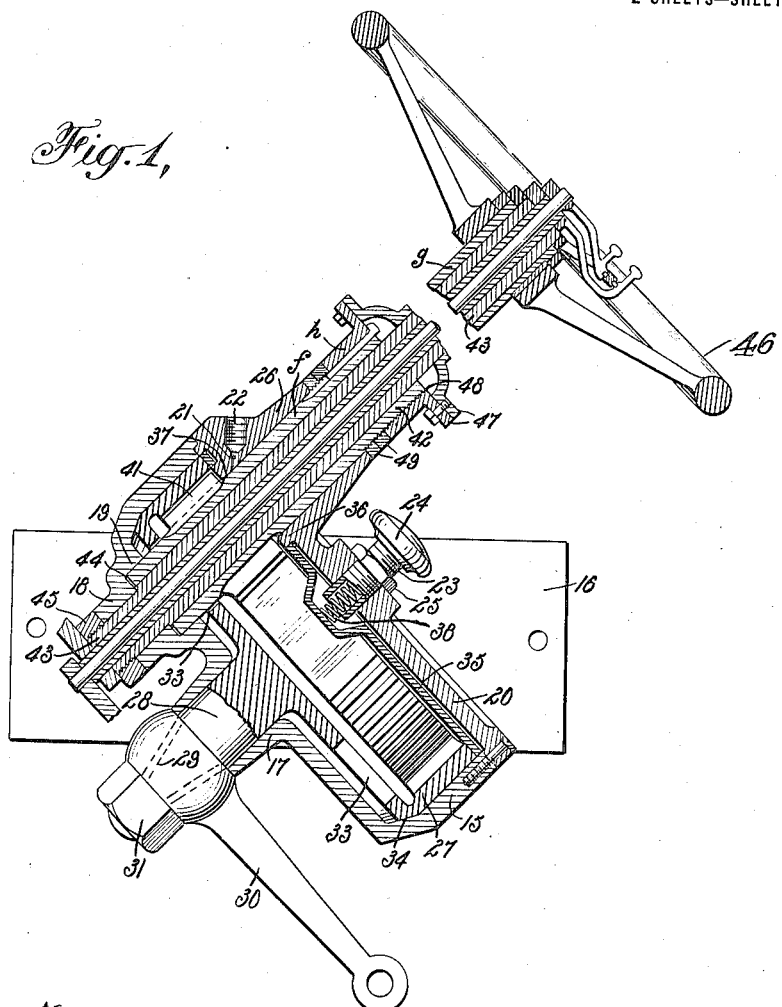
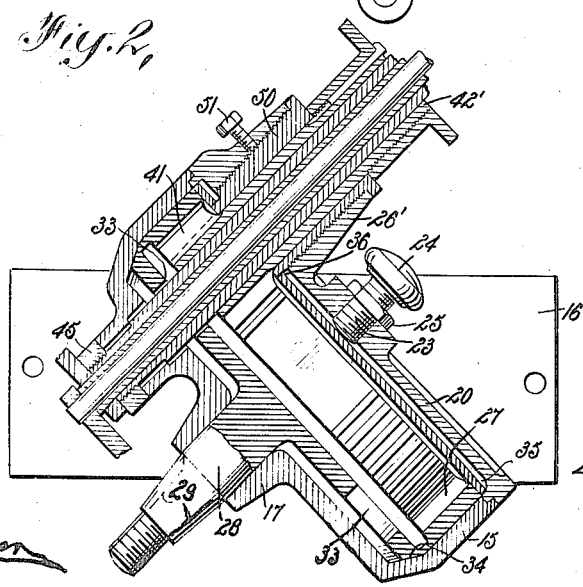
WITNESSES
INVENTOR
L. A. Peterson
BY
ATTORNEYS

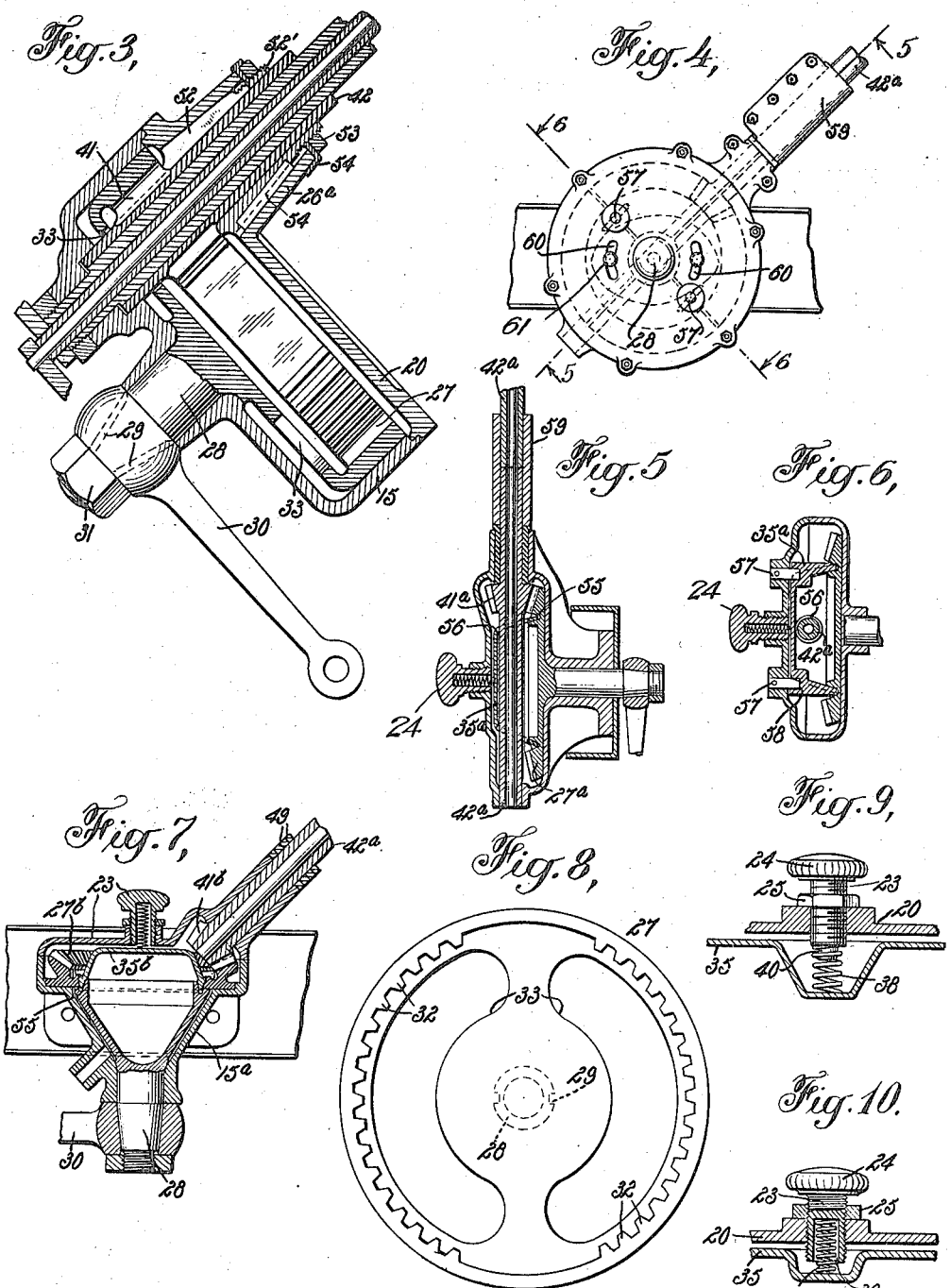

UNITED STATES PATENT OFFICE.

LARS AUGUST PETERSON, OF STOCKHOLM, SWEDEN, ASSIGNOR OF ONE-HALF TO RICHARD TJADER, OF NEW YORK, N. Y.

STEERING DEVICE FOR AUTOMOBILES AND THE LIKE.

1,180,940.

Specification of Letters Patent. Patented Apr. 25, 1916.

Application filed March 22, 1916. Serial No. 85,860.

*To all whom it may concern:*

Be it known that I, LARS AUGUST PETERSON, a subject of the King of Sweden, and a resident of Stockholm, Sweden, have invented a new and Improved Steering Device for Automobiles and the like, of which the following is a full, clear, and exact description.

This invention relates to steering devices for automobiles or the like, and has particular reference to means to prevent unnecessary and undesirable lost motion and freedom of movement of the steering post under the influence of natural roadway tendencies to cause vibration of the steering mechanism from the wheels.

Among the objects of the invention, therefore, is to provide an improved steering device or an attachment for a steering device whereby the operator is relieved from all or practically all of the shock or strain incident to the vibration of the steering mechanism due to irregularities or obstructions in the roadway.

More definitely stated, this invention provides means whereby the rotation of the steering wheel is imparted at increased power and correspondingly lower speed to the steering post, adjustable friction means being provided to constitute a means to check or resist the independent rotation of one or more of these parts, thereby relieving the operator from the strains that would be incident to such undesired rotation and yet without increasing the force required on the part of the operator to control his machine in the usual manner.

A further object of the invention is to provide a friction checking means to resist the independent rotation or movement of the steering post with means for varying the force of the friction at the will of the operator, while the machine is in motion, so as to accommodate the mechanism to various kinds or conditions of roads.

With the foregoing and other objects in view, the invention consists in the arrangement and combination of parts hereinafter described and claimed, and while the invention is not restricted to the exact details of construction disclosed herein, still for the purpose of illustrating a practical embodiment thereof reference is had to the accompanying drawings, in which like reference characters designate the same parts in the several views, and in which—

Figures 1, 2 and 3 are vertical sectional views of various modifications of this invention; Fig. 4 is a side elevation of another modification; Fig. 5 is a longitudinal section on the line 5—5 of Fig. 4; Fig. 6 is a transverse section on the line 6—6 of Fig. 4; Fig. 7 is a vertical sectional view of another modification; Fig. 8 is a plan view of the form of gear wheel shown in Figs. 1, 2 and 3; and Figs. 9 and 10 are sectional views of details of the adjustment means.

Referring now more particularly to Fig. 1, I show a gear casing 15 secured rigidly upon a bracket 16 through which the device may be secured in place upon the machine. The casing has a central bearing 17 at its lower side and an eccentric bearing 18 above the central bearing. The latter bearing is counterbored as shown at 19. The casing is provided with a cover plate 20 which may be locked thereon tightly by any suitable means, thereby providing a practically grease-tight casing, lubricant of any suitable nature being adapted to be introduced into the interior thereof through a hole 21 normally closed by a plug 22. The cover 20 is tapped at its center in alinement with the axis of the bearing 17 to receive an adjustment screw 23 having a head or knob 24 at its outer end and having a lock nut 25 adapted to bear against the outer surface of the tapped portion of the cover, if desired, to lock the screw from rotation. The cover 20 is also provided with an eccentric bearing 26 having its axis in alinement with the axis of the bearing 18. In this form of the invention a gear wheel 27, preferably of the form shown in Fig. 8 in plan view, is mounted within the casing 15 and is provided with an arbor 28 having bearing in and projecting through the central bearing 17 at the bottom of the casing. The lower projecting end of the arbor is tapered and provided with key seats 29 on opposite sides, and upon this tapered portion is secured an arm 30 by means of a nut 31, the arm being adapted to be connected by links, rods or other mechanism in any well known or approved manner with the steering knuckles of the automobile or corresponding parts of other machines, such connected parts being not shown since they are not pertinent to the present invention.

As shown best in Fig. 8, I provide two sets of internal or inwardly projecting teeth 32, each set being adjacent or opposite an arc-shaped slot 33, the same being formed concentric with the arbor 28. This construction of the wheel having two sets of gear teeth and two slots 33 provides a neat, symmetrical and comparatively light structure and also provides for the reversal of the wheel after one set of teeth become worn so as to present a fresh set of teeth, thereby doubling the life of the part. Two keyways 29 are provided to utilize this reversible feature of the gear in connecting the arm 30 thereto.

The periphery of the gear 27 or a portion thereof may be formed conical, as indicated at 34, for coöperation with a similarly formed inner surface of the casing.

At 35 I provide a disk-like friction plate within the upper portion of the casing between the rim of the wheel 27 and the cover 20, the diameter of the plate 35 being preferably the same as that of the wheel. The plate is provided with an eccentric hole 36 into which projects the collar 37 of the bearing 26 and thereby the friction plate 35 is positively held from rotation. The adjusting screw 23 may bear directly upon the central portion of the plate 35 but preferably the contact between the screw and the plate is had through a spring 38 having one end extending into a cavity 39 in the inner end of the screw or surrounding a plug 40, as shown in Figs. 10 and 9 respectively. The point of contact of the spring upon the plate may be depressed, as shown in the detail views, to provide a more stable connection of these parts. Force applied to the plate through the screw will increase the friction between the conical coöperating surfaces of the wheel and casing so as to more or less completely resist the tendency of the wheels of the machine to actuate the steering wheel. Under ordinary conditions the operator, even while the machine is in operation, may actuate the screw by hand or otherwise to tighten or release the frictional effect of the plate 35 bearing upon the periphery of the wheel and that of the wheel itself upon the conical surface of the casing according to variations in the steering conditions of the roadway. By increasing the friction it is obvious that the hand wheel may be left idle more or less with impunity without likelihood of disturbance of the position of the steering wheel due to the reverse action of the steering apparatus.

At 41 is indicated a steering pinion connected to or formed upon a hollow steering shaft 42 journaled in the coaxial eccentric bearings 18 and 26. Said pinion 41 meshes with one or the other of the sets of teeth 32 of the wheel 27, and the hollow shaft extends loosely and freely through the adjacent slot 33, thereby providing for free movement of the wheel to the necessary extent for steering purposes. A stationary shaft 43 extends through the steering shaft 42 and has a shoulder 44 adjacent its lower end abutting against the offset formed by the counterbore 19 of the bearing 18 and is locked in place by means of a nut 45 at the lower end of the bearing 18. Within this stationary shaft are journaled the usual manually controlled shafts for the ignition mechanism and gasolene supply. The steering shaft 42 is shown composed of a plurality of parts $f$, $g$ and $h$. The part $f$ has the pinion 41. A hand wheel 46 is secured by means of a key or otherwise to the upper shaft portion $g$, and the intermediate portion $h$ is connected to the upper portion by means of collars 47 or their equivalent. This provision of a plurality of parts for the shaft adapts the device to different makes or types of machines. The part $h$ may be connected to the lower part $f$ by screw threading, as shown at 48, and by this form of connection a certain amount of elongation may be provided for the shaft as a whole by introducing one or more filling rings 49.

From what has been stated above, the operation of this mechanism may be briefly summarized as follows: Rotation of the hand wheel in a certain direction corresponding to the usual action of the steering wheel will cause a corresponding rotation of the gear wheel 27, though at lower speed and with a resultant corresponding steering of the machine. The larger the pinion in proportion to the effective diameter of the gear wheel 27, the less will be the disparity between the angular movements of the hand wheel and gear wheel. It will be appreciated that it is not my primary purpose to modify materially the usual steering action, the major purpose being rather to resist the automatic interference on the part of the running machine with the steering mechanism. On the other hand, the smaller the pinion 41 with a corresponding increase of power afforded to the operator for steering the machine, the greater will be the resistance afforded by the mechanism preventing the undesirable action of the steering mechanism independently of the operator. With the increased advantage to the operator incident to the speed reduction through the gearing 41 and 27, a fairly considerable amount of friction may be put upon the gear wheel between the relatively movable portions thereof and the casing and plate without burdening the operator in the least. It will be appreciated, however, that with a moderate degree of friction applied to the wheel 27 and said wheel coöperating with the small pinion whose position is controlled by the hand wheel, it is practically impossible for lateral vibration of the vehicle wheels to be felt by the operator at the hand wheel.

In Fig. 2 the principal parts are the same in structure and function as stated above with respect to Fig. 1. In order to adjust the pinion 41, however, so as to take up wear or looseness with respect to the teeth 32 of the gear wheel 27 I provide an eccentric bushing 50 secured as by screw threads or otherwise in the eccentric bearing portion 26' of the cover 20. A set screw 51 serves to lock the bushing 50 at any desired angle of rotary adjustment so as to position the shafts and pinions surrounding the same toward or from the gear teeth 32. The pinion shaft 42' does not extend below the gear wheel in this form of the invention.

In Fig. 3 the gear casing 15, cover 20 and other main parts are substantially the same as above described in detail, but the eccentric bearing portion 26ª of the cover is formed frusto-conical, tapering upwardly, and is fitted with a correspondingly formed split sleeve 52 having a threaded upper end 52' projecting above the end of the cover bearing for the accommodation of an adjustment nut or wheel 53. Any suitable means such as a bendable key 54 may be employed to lock the nut or wheel 53 in position after actuation thereof upon the split sleeve to draw the same upwardly more or less according to the variable amount of friction set up thereby between the pinion shaft 42 and the sleeve. This sleeve constitutes the bearing for the shaft 42 and is held from rotation by means of a spline 54 or its equivalent. The nut or wheel 53 constitutes a means whereby the operator may manually adjust the variable friction governing the amount of resistance desired against the tendency for the vehicle wheels to oscillate, such adjustment as above described being capable of being performed at any time, even while the machine is in operation.

In the modification shown in Figs. 4, 5 and 6, the pinion 41ª and gear 27ª are of the bevel type, and the casing 15ª is changed in design accordingly. In certain types of machines this form of the invention is preferable because it is more compact and compendious than the form in which spur gearing is shown. The friction plate 35ª in this form serves the same functions as before and is manipulated preferably by the manually controlled screw 24 carried by the upper or outer cover 20ª of the casing. This friction plate, however, is cup-shaped and the rim or periphery thereof is of double conical form and fits into a correspondingly formed groove 55 in the upper face of the gear 27ª. The pinion shaft 42ª projects more or less loosely through holes 56 formed in the opposite sides of the rim of the cup-shaped plate or between the disk portion of the plate and the gear wheel. These openings 56 are large enough to provide for ample adjustment of the friction plate toward or from the gear wheel for the purpose of varying the friction. The cup-shaped plate 35ª is prevented from rotation and from dragging contact with respect to the pinion shaft by means of pins 57 (see Fig. 6) carried by the cover 20ª and projecting into sockets 58 formed in opposite sides of the friction member 35ª. In this form of the invention I show the pinion shaft as being made in sections coupled by a clamp 59 as an indication of various means for making connection between shaft sections. The casing 15ª and the inclination of the shaft devices supported thereby are variable by means of slots 60 formed as arcs of circles concentrically with the axis of the arbor 28, locking devices 61 passing through said slots to clamp the parts in place.

The form in Fig. 7, like that last described, includes a bevel gearing including a pinion 41ᵇ and a gear 27ᵇ. The gear in this form is cup-shaped and provided with a double conical groove 55 the same as in the other form and with which a friction cup-shaped plate 35ᵇ coöperates under the influence or control of the manually controlled screw 23.

I claim:

1. The herein described steering device comprising a main casing, a gear wheel within the casing, an arbor connected to the gear wheel and projecting outwardly from the casing, a pinion within the casing meshing with the gear wheel, means to rotate the pinion freely by hand and thereby rotate the gear wheel for steering purposes, and variable friction means to resist the backlash or tendency of the vehicle to disturb the position of the pinion and the means connected thereto for actuation thereof.

2. In a steering device, the combination of a main gear, an arbor projecting axially therefrom for connection to the parts to be steered, a pinion meshing with the gear, a hand wheel connected with the pinion for free rotation thereof and through it the steering devices, and variable friction means applied to certain of the foregoing parts to resist the tendency for backlash from the parts being steered.

3. In a steering device, the combination of a main gear wheel, an arbor projecting axially therefrom for connection to the parts to be steered, a pinion meshing with the gear, a shaft carrying the pinion, a hand wheel secured to the shaft for rotation thereof and the pinion, a friction member coöperating with one of the rotating parts above described, manually controlled screw means for varying the degree of friction through said friction member, whereby tendency to backlash from the parts being steered is resisted, but leaving the intended rotation of the pinion practically free.

4. In a steering device, the combination of a casing having a concentric bearing and an eccentric bearing having its axis parallel to the axis of the first bearing, a gear wheel within the casing and having frictional contact therewith, an arbor extending from the gear wheel through the first mentioned bearing for connection with the parts to be steered, a hand wheel, a shaft to which the hand wheel is connected and journaled in the eccentric bearing, a pinion connected to the shaft and meshing with the gear wheel whereby the steering devices may be easily operated from the hand wheel, and manually controlled means for varying the degree of friction between the gear wheel and the casing.

5. In a steering device, the combination of a casing having a conical portion and having a central and also an eccentric bearing, a cover for the casing, said cover having a bearing in axial alinement with the aforesaid eccentric bearing, a gear wheel within the casing, an arbor projecting from the gear wheel and through the first mentioned bearing, said gear wheel having internal teeth, a shaft journaled in said eccentric bearings, a pinion on the shaft meshing with said internal teeth, means to rotate the shaft causing thereby rotation of the gear wheel in the same direction but at lower speed, a friction plate within the casing between the gear wheel and the cover, said plate having an eccentric hole through which the shaft passes, and manually controlled means acting upon the plate whereby the plate is forced more or less firmly against the gear wheel with a corresponding variation in friction between the gear wheel and the casing.

6. In a steering device, the combination of a gear wheel, a rigid support for the gear wheel having frictional contact therewith, a shaft arranged parallel to the axle of the wheel, a pinion on the shaft meshing with the gear teeth, means including a manually controlled screw and a plate coöperating with the gear to vary the friction between it and the support, said plate having a hole at one side through which the shaft projects, and means coöperating with the shaft to adjust the pinion toward or from the teeth of the gear.

LARS AUGUST PETERSON.

Witnesses:
L. ROWELL,
CLAIR P. HULTBERG.